United States Patent [19]

Lambers

[11] Patent Number: 5,100,730
[45] Date of Patent: Mar. 31, 1992

[54] STRUCTURAL REINFORCEMENT APPARATUS AND METHOD OF MAKING SAME

[76] Inventor: Thomas J. Lambers, 4461 66th St., Holland, Mich. 49423

[21] Appl. No.: 437,648

[22] Filed: Nov. 16, 1989

[51] Int. Cl.[5] .............................................. B32B 5/16
[52] U.S. Cl. .................................. 428/402; 428/313.3; 428/314.2; 428/317.9; 428/403
[58] Field of Search ............... 428/166, 313.3, 313.5, 428/313.7, 313.9, 402, 403, 316.6, 317.9, 314.2

[56] References Cited

U.S. PATENT DOCUMENTS

| | | | |
|---|---|---|---|
| 3,060,561 | 10/1962 | Watter | 29/423 |
| 3,168,432 | 2/1965 | Elfving | 161/69 |
| 3,403,068 | 9/1968 | Yost | 161/130 |
| 3,440,130 | 4/1969 | Telkes | 428/313.5 |
| 3,544,417 | 12/1970 | Corzine | 161/50 |
| 3,608,010 | 9/1971 | Stayner | 264/51 |
| 3,616,029 | 10/1971 | Lerman | 428/316.6 |
| 3,819,007 | 6/1974 | Wirt et al. | 181/33 G |
| 3,950,585 | 4/1976 | Hale | 428/181 |
| 3,966,013 | 6/1976 | Hatch et al. | 181/33 G |
| 3,975,882 | 8/1976 | Walter | 52/571 |
| 3,985,198 | 10/1976 | Kurtze et al. | 428/314.8 |
| 4,061,807 | 12/1977 | Shaler et al. | 428/316.6 |
| 4,110,499 | 8/1978 | Harrison | 428/402 |
| 4,250,136 | 2/1991 | Rex | 428/313.3 |
| 4,287,250 | 9/1981 | Rudy | 428/166 |
| 4,348,442 | 9/1982 | Figge | 428/72 |
| 4,610,836 | 9/1986 | Wycech | 264/313 |
| 4,666,766 | 5/1987 | Brotz | 428/313.3 |
| 4,709,781 | 12/1987 | Scherzer | 428/317.9 |
| 4,769,391 | 9/1988 | Wycech | 521/54 |
| 4,851,285 | 7/1989 | Brotz | 428/313.3 |

OTHER PUBLICATIONS

"Shaped Fibers May Boost Composite Strength", from *Machine Design*, Aug. 23, 1990, p. 40.
Design and Fabrication Techniques for Honeycomb of NOMEX® Aramid Sandwich Structures-DuPont E-50699.
DuPont Aramids for Advanced Composites-H. Y. Loken, Mar. 9, 1982.

*Primary Examiner*—William J. Van Balen
*Attorney, Agent, or Firm*—Basile and Hanlon

[57] ABSTRACT

A structural reinforcement apparatus comprising hollow geometrically defined cell members. These geometrically defined members may be bonded together to form a lightweight strong panel. A sandwich may be formed by applying a layer of suitable material to each side of the panel. These panels can be used to form the hull of vehicles and to form insulating panels and structural panels in building construction.

21 Claims, 2 Drawing Sheets

STRUCTURAL REINFORCEMENT APPARATUS AND METHOD OF MAKING SAME

I. FIELD OF THE INVENTION

The present invention generally relates to structural panels made from hollow or closed cell particles bonded together into a foam. This results in a lightweight strong and rigid structural member suitable as a laminate core material, or as a complete part by its self. As a core material the structural material as anticipated by the present invention will be able to greatly increase the strength and stiffness of the laminate with little or no increase in weight.

II. BACKGROUND OF THE INVENTION

In recent years the laminate core panels of a honeycomb sandwich construction had become increasingly popular in the manufacture of structural panels. The honeycomb sandwich panels comprise a pair of spaced face sheets with a honeycomb core positioned between the face sheets, and with the honeycomb bonded to the face sheet. These honeycomb panels are lightweight and able to withstand considerable compressive loads along the axis of the honeycomb. They are however limited in the amount of bending and sheer loads that can be carried because the bonding between the face sheets and the honeycomb is essentially a line contact with limited area for bonding the honeycomb and the face sheet.

Other core materials that are used in structural sandwich construction include PVC foam and balsa wood. PVC foam is easily deployed between the face sheets and initially forms a lightweight sandwich. However the foam has limited strength and in applications such as a boat hull, repeated pounding and stress encountered in rough weather eventually breaks down the foam structurally and what remains is a loose sand like powder positioned between the face sheets. Balsa wood has been tried as a core material for sandwich construction in boat hulls, but the Balsa wood has an affinity for moisture which eventually greatly adds to the weight of the overall structure making it a marginal material at best.

Examples of core materials for sandwich panels are illustrated in U.S. Pat. Nos. 4,348,442; 3,950,585; 3,168,432; 3,975,882; 3,966,013; 3,819,007; 3,544,417; 3,403,068; and 3,060,561. None of the above listed patents disclose nor anticipate the closely packed closed cell structure of the present invention with the closed cells bonded one to another and to the face sheets to form an incredibly strong sandwich structure capable of accommodating much higher sheer and bending loads.

SUMMARY OF THE INVENTION

The invention, which will be described in greater detail hereinafter, comprises a panel having a lightweight core consisting of hollow, geometrically defined cell members or particles with at least one flat side. These geometrically defined particles are bonded together to form a lightweight, strong panel or core. In a preferred embodiment a sandwich is formed by applying a layer of plastic material, such as polyacrylic to each side of the panel. These panels are used to form the hull of boats or as structural panels in buildings and aircraft. These panels can also form insulating panels in building construction. The simplest particle contemplated in the practice of this invention for forming the central core would be a tetrahedron which comprises a pyramid having a triangular base. The most complex particle currently contemplated for this invention is currently envisioned as a dodecahedron which is formed from 12 five-sided or pentagonal surfaces. It is anticipated the particles would be joined together using a bonding agent which could be a time set or heat set material which would bond the particles one to another and to the outer layers of the panel. The bonding agent would also serve to fill any voids that might exist between particles and between the face of particles and the face sheets.

The structural integrity of the hollow or closed cell members and their ability to withstand substantial compressive, sheer and tensile stress, along with their ability to transfer loads from one cell to another forms an exceptionally strong structural member. The core material when bonded is sufficiently strong that it can form a structural member by itself without the addition of face sheets.

The air space in each closed cell provides an excellent insulation. It is anticipated that while the closed cell construction makes an excellent and strong lightweight material, the entrapped air in the cells also provides an excellent insulating material as well. It is envisioned by the inventor that excellent structural and insulating panels can be formed by a core of bonded closed cell particles with inexpensive face sheets of aluminum foil for reflective insulation with the core providing excellent insulation against heat conduction.

BRIEF DESCRIPTION OF THE DRAWINGS

The description herein makes reference to the accompanying drawing wherein like reference numbers refer to like parts throughout the various views and wherein.

DESCRIPTION OF THE PREFERRED EMBODIMENT

Figure 1:
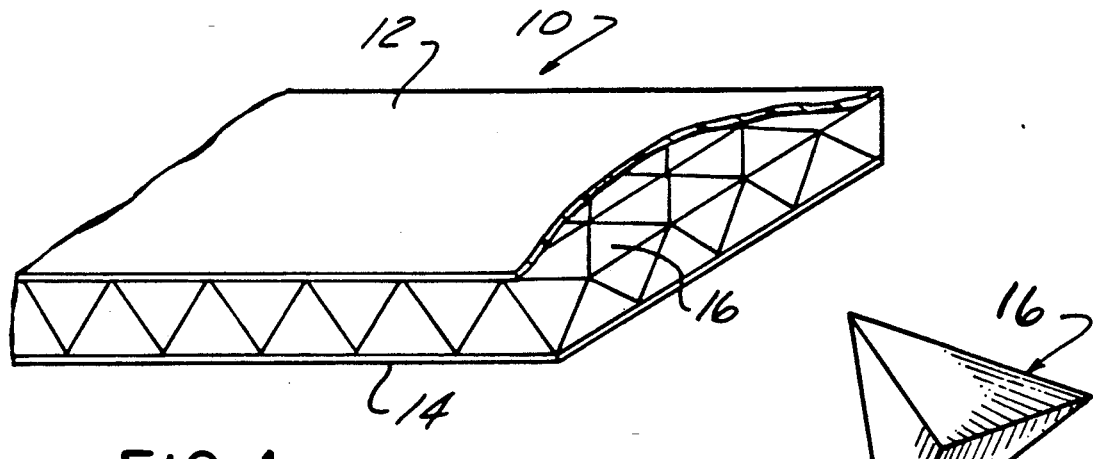
FIG. 1 illustrates a perspective view of a structural panel for the present invention.
Figure 2:
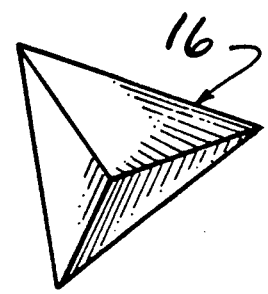
FIG. 2 illustrates a closed cell particle of tetrahedron shape having sides of identical length.

Referring now to the drawing, there is illustrated in FIG. 1 one example of the present invention in the form of a sandwich panel 10 comprising a pair of spaced face sheets 12, 14 with closely packed hollow or closed cell members 16 confined between the sheets. The closed cell particles 16 used in the sandwich panel 10 are shown in a perspective view in FIG. 2 of the drawing. FIG. 2 comprises a tetrahedron shaped closed cell particle having four triangular sides of equal size. The closed cell particles 16 are closely packed and bonded one to another and to the adjacent sheets or panels 12, 14 by suitable bonding agents such as epoxy. It is anticipated that the bonding agent can be either time set or temperature set and can be any of a wide variety of adhesives currently available in the market. It is further anticipated in the invention that the closed cell particles 16 can be coated with an adhesive before assembling into, for example closely packed configurations shown in FIG. 10. The panels shown in FIG. 10 of the drawing will have superior strength characteristics compared to, for example, the honeycomb panel in that the closely packed closed cell particles 16 are able to resist dimpling, compression, and tension, and provide a surface to bond to each other and to the panel.

Figure 3:
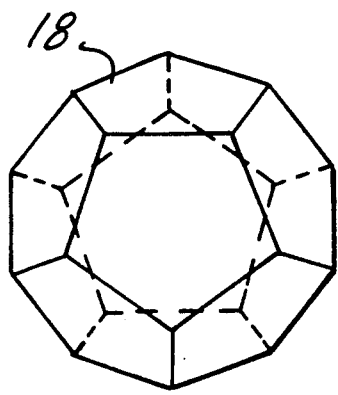
FIG. 3 illustrates a top view of a dodecahedron particle of the present invention.
Figure 4:
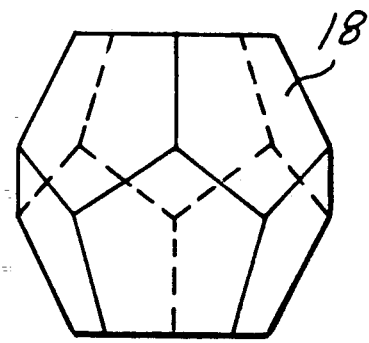
FIG. 4 illustrates a side view of the dodecahedron particle of FIG. 3.

The core of the panel 10 can also be formed using a dodecahedron particle 18 as illustrated in FIGS. 3 and 4 of the drawing. The dodecahedron 18 comprises 12 sides made up of pentagon shaped pieces joined together to form a closed cell particle. The dodecahedron 18 is considered an ideal closed cell particle in that it packs well and has a plurality of flat sides which can abut with adjacent dodecahedron particles and they can be strongly bonded one to another. Also the dodecahedron 18 presents a flat side that can be strongly bonded to the face sheets 12, 14.

The dodecahedron closed cell particle 18 serves as an excellent core particle because it packs well between panels or face sheets 12, 14. In the formation of boat hulls having a double curvature for example a slurry of epoxy resin and dodecahedron particles 18 can be formed and inserted between spaced face sheets in a mold to form a boat hull. Vibration and mechanically packing can also be employed to closely pack the closed cell particles 18 into close intimate contact with each other and with the face sheets 12, 14.

Figure 5:
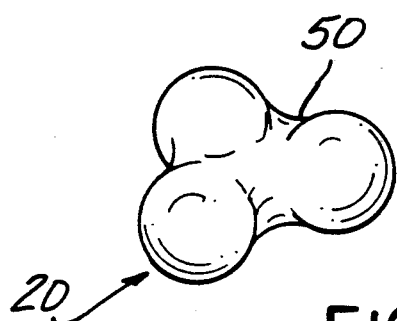
FIG. 5 illustrates a three ball particle of the present invention.
Figure 6:
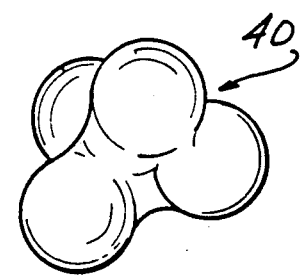
FIG. 6 illustrates a perspective view of the four ball closed cell particle of the present invention.

FIGS. 5 and 6 of the drawing illustrate two additional types of closed cell particles that can readily be used as a sandwiched material in panel 10. The particles illustrated in FIGS. 5 and 6 comprises respectively three and four spherical pieces joined together in a continuous single cell member or particle with a curved wall or web 50 joining the spheres one to another in a continuous closed cell manner. The wall or web 50 between spheres in the particles 20 and 40 is concave and should have a radius equal to the radius of the balls so that the particles can nestingly engage one another and present a surface that will readily bond the particles one to another. This forms a strong core capable of withstanding substantial compressive tensile and sheer stresses.

Figure 7:
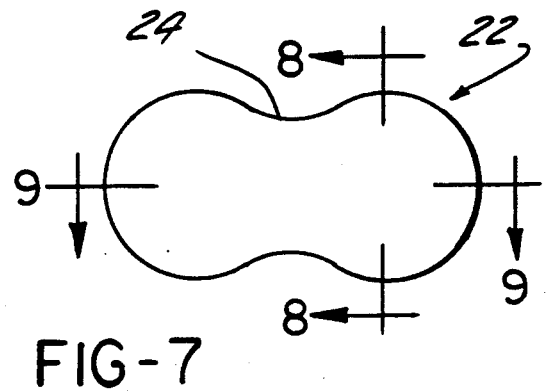
FIG. 7 illustrates a side view of a two ball closed cell particle.
Figure 8:
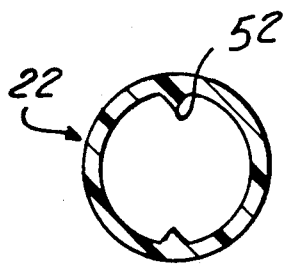
FIG. 8 illustrates a cross sectional view of the closed cell particle of FIG. 7 taken along the plane 8—8 of FIG. 7.
Figure 9:
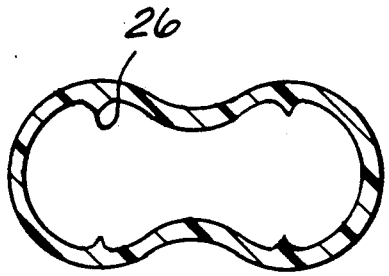
FIG. 9 illustrates a cross sectional view of the particle of FIG. 7 taken along the line 9—9 of FIG. 7.
Figure 11:
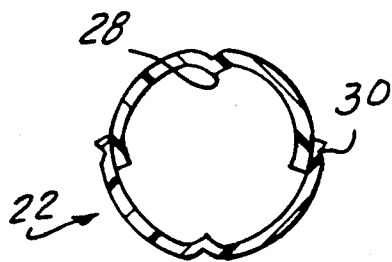
FIG. 11 illustrates a cross sectional view of an alternate construction of FIG. 7 taken along the line 8—8 wherein overlapping joints are used to assemble the closed cell of FIG. 7 and a uniform wall thickness is employed in the hands of the closed cell particle FIG. 7.

Referring now to FIG. 7 of the drawing there is illustrated at 22 a two sphere closed cell particle comprising a pair of spaced spheres which are joined at a waist 24 by a concave wall having a radius equal to the radius of the sphere. This enables the closed cell particles 22 to nestingly engage one another and provide long extensive line or planar contact for bonding the particles 22 one to another. FIG. 8 of the drawing illustrates a cross sectional view of the particle 22 taken along the line 8—8 of FIG. 7. The strength of the particle 22 can be substantially improved by addition of longitudinal ribs 52 extending around the interior of the closed cell particle 22. FIG. 9 of the drawing illustrates a cross sectional view of the particle 22 taken along the line 9—9 of FIG. 7. Transverse ribs 26 extending around the inside of the particle 22 as shown in FIG. 9 further increase the structural strength of the particle 22. FIG. 11 of the drawing illustrates an alternate configuration for reinforcing the wall of the particle 22 by employing a reinforcing groove 28 which extends around the particle 22. This allows the use of a uniform sheet material to form the walls of the particle 22. The configuration shown in FIG. 11 of the drawing also shows the particle 22 made in two halves with an overlapping joint 30 which further enhances the strength of the particle 22.

Figure 10:
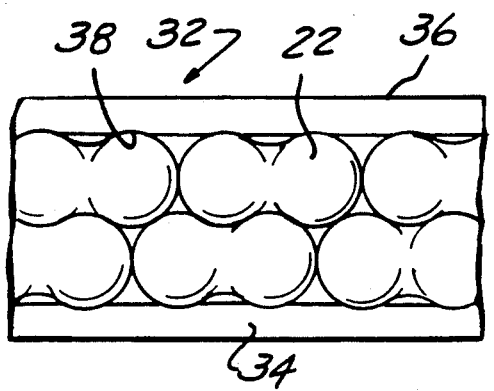
FIG. 10 illustrates a cross sectional view of the sandwich panel utilizing the closed cell particles of FIG. 7 wherein the face sheets are dimpled to nestingly receive the hemispherical shapes of the particle of FIG. 7.

Referring now to FIG. 10 of the drawing there is illustrated a sandwich panel 32 formed by a core of closed cell particles 22 tightly packed and joined one to another and positioned between a pair of spaced face sheets 34, 36. The sheets 34, 36 employ a plurality of spaced dimples 38. The spaced dimples 38 are positioned to receive the spheres of the particle 22 and employ a spherical radius identical to the spherical radius of the ends of the particles 22. This permits a surface bond between the particles 22 and the face sheets 34, 36. This assures a strong bond between the sheets 34, 36 and greatly enhances the sheer strength of the panel.

It will be apparent to one experienced in the construction and use of structural panels that the cores described above can be free standing, strong and rigid structural panels by themselves without the addition of the face sheets 12, 14 shown in FIG. 1 (34, 36 in FIG. 10). While the face sheets 12, 14 add some strength to the structural panel, their presence mostly is cosmetic to provide a smooth, attractive panel surface.

The method for forming the closed cell particles described above comprises the steps of:

A. Dimpling a first sheet to form a plurality of first halves in the first sheet;

B. Dimpling a second sheet to form a plurality of second halves of the particle in the second sheet, said second half dimples to be aligned in opposed registry with the first half dimples;

C. Applying a layer of adhesive between the first and second sheets;

D. Bonding the first sheet to the second sheet to form a plurality of closed cell particles; and E. Removing any excess sheet material from between individual hollow cell members, thereby releasing the individual cell members from the sheet material.

It can thus be seen that the present invention has provided a new and improved sandwich panel for structural applications. The panels of the present invention can be employed in building construction both as a structural material and as an insulating panel. The panels of the present invention can be used also in aircraft, space vehicles, ground vehicles and water craft.

It will also be apparent to those skilled in the art of structural castings that, for example, ceramic closed cells could be employed and mixed with molten metal to form a structural casting that is substantially lighter but as strong as a casting made from solid material. It is also apparent to the skilled artisan that any of the closed cell particles contemplated by the above invention could be made from metallic materials and employed in the high temperature or other applications.

The face sheets 12, 14 are preferably made from fiber reinforced plastic or other suitably rigid polymeric materials, and may also be made from other suitable plastic, metal, ceramic and wood. The cells may be made from comparable materials.

The size of the particles employed in the practice of this invention can range from 0.010 inches (0.254 mm) on the low side to 3.0 inches (26.2 mm) on the large side. It may also be useful in certain applications to utilize a variety of particle sizes and/or shapes to fulfill a specific function.

While the preferred method for bonding the closed cell particles together is to use a liquid adhesive which is either time set or temperature set, it is also possible to coat the outer surface of the particles with adhesive during the manufacturing process and then thermally bond them together.

It can thus be seen that the present invention has provided a new and improved structural panel having a lightweight but strong core utilizing particles with at least one flat side. These geometrically defined particles are bonded together to form a lightweight core.

It should be understood by those skilled in the art of structural panels that other forms of the Applicant's invention may be had, all coming within the spirit of the invention and the scope of the appended claims.

Having thus described my invention what I claim is:

1. An apparatus for providing structural reinforcement, comprising:
   a plurality of closely packed, hollow cell members having predetermined geometric sizes and shapes wherein said hollow cell members are formed from opposed halves joined together along mating edges.

2. The structural reinforcement apparatus as defined in claim 1, further comprising means, admixed with said cell members, for bonding the cell members one to another.

3. The structural reinforcement apparatus as defined in claim 2 wherein said bonding means comprises a temperature set bonding agent.

4. The structural reinforcement apparatus as defined in claim 2 wherein said bonding means comprises a time set bonding agent.

5. The structural reinforcement apparatus as defined in claim 1 wherein each of the hollow cell members has a wall of a formed plastic material, with an outer layer of a temperature activated bonding agent covering said wall.

6. A method for making hollow cell reinforcing members, the method comprising the steps of:
   dimpling a first sheet of selected material to form a plurality of first halves of the reinforcing members in said first sheet;
   dimpling a second sheet of selected material to form a plurality of second halves of the reinforcing members in said second sheet, said second half dimples to be aligned and in opposed registry with said first half dimples;
   applying a layer of bonding material between said first and second sheets;
   bonding said first sheet to said second sheet to form a plurality of hollow cell members; and
   removing any excess sheet material from between individual hollow cell members, thereby releasing the individual cell members from the sheet material.

7. An apparatus for providing structural reinforcement, comprising:
   a plurality of closely packed, hollow cell members having predetermined geometric sizes and shapes, wherein the geometric shape of the hollow cell member is peanut-shaped, and wherein the peanut-shaped cell members comprise spherical ends and a central waist section of reduced diameter joining the ends, said peanut-shaped cell members adapted to nestingly abut adjacent peanut-shaped cell members.

8. The structural reinforcement apparatus as defined in claim 7 wherein the peanut-shaped cell member comprises at least three spherical ends joined together by webs defining the central waist sections.

9. The structural reinforcement apparatus as defined in claim 1 wherein the geometric shape of the hollow cell member includes at least one flat side adapted to abut adjacent cell members.

10. The structural reinforcement apparatus as defined in claim 1 wherein the size of each hollow cell member ranges between about 0.254 mm and about 76.2 mm.

11. The structural reinforcement apparatus as defined in claim 1, further comprising a pair of spaced face sheets, the hollow cell members being disposed between said face sheets.

12. The structural reinforcement apparatus as defined in claim 11 wherein the hollow cell members are bonded to each other and to the face sheets.

13. The structural reinforcement apparatus as defined in claim 1 wherein the hollow cell members are formed from a rigid polymeric material.

14. The structural reinforcement apparatus as defined in claim 1 wherein the hollow cell members are formed from a material selected from the group consisting of fiber reinforced plastic, metal, ceramic and wood.

15. An apparatus for providing structural reinforcement, comprising:
   a plurality of closely packed, hollow cell members having predetermined geometric sizes and shapes wherein the hollow cell members are admixed with molten metal.

16. An apparatus for providing structural reinforcement, comprising:
   a plurality of closely packed, hollow cell members formed from a rigid polymeric material and having predetermined geometric shapes, the size of each hollow cell member ranging between about 0.254 mm and about 76.2 mm, wherein said hollow cell members are formed from opposed halves joined together along mating edges; and
   means, admixed with the cell members, for bonding the cell members one to another.

17. The structural reinforcement apparatus as defined in claim 16 wherein the geometric shape of the hollow cell member includes at least one flat side adapted to abut adjacent cell members.

18. An apparatus for providing structural reinforcement, comprising:
   a plurality of closely packed, hollow cell members formed from a rigid polymeric material and having predetermined geometric shapes, wherein the geometric shape of the hollow cell member is peanut-shaped, and wherein the peanut-shaped cell members comprise spherical ends and a central waist section of reduced diameter joining the ends, said peanut-shaped cell members adapted to nestingly abut adjacent peanut-shaped cell members, the size of each hollow cell member ranging between about 0.254 mm and about 76.2 mm; and means, admixed with the cell members, for bonding the cell members one to another.

19. The structural reinforcement apparatus as defined in claim 18 wherein the peanut-shaped cell member comprises at least three spherical ends joined together by webs defining the central waist sections.

20. The structural reinforcement apparatus as defined in claim 16 wherein the geometric shape of the hollow cell member is a tetrahedron.

21. The structural reinforcement apparatus as defined in claim 16 wherein the geometric shape of the hollow cell member is a dodecahedron.

* * * * *